(12) United States Patent
Shin et al.

(10) Patent No.: US 7,688,813 B2
(45) Date of Patent: Mar. 30, 2010

(54) MONITORING CONTROL SYSTEM AND METHOD

(75) Inventors: Sang-Cheol Shin, Gyeonggi-do (KR); Kyung-Hoon Kim, Seoul (KR); Jong-Cheol Jung, Seoul (KR); Young-Ho Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 926 days.

(21) Appl. No.: 11/286,891

(22) Filed: Nov. 22, 2005

(65) Prior Publication Data

US 2006/0126523 A1 Jun. 15, 2006

(30) Foreign Application Priority Data

Nov. 22, 2004 (KR) ...................... 10-2004-0095933

(51) Int. Cl.
*H04L 12/50* (2006.01)
(52) U.S. Cl. ...................................... 370/373; 709/224
(58) Field of Classification Search ............ 370/395.53, 370/389, 439, 349, 362, 384, 385, 373, 377, 370/255; 709/224
See application file for complete search history.

(56) References Cited

U.S. PATENT DOCUMENTS

| 5,764,912 | A | * | 6/1998 | Rosborough | ................ 709/224 |
| 7,020,438 | B2 | * | 3/2006 | Sinivaara et al. | ........... 455/41.2 |
| 2002/0112047 | A1 | | 8/2002 | Kushwaha et al. | |
| 2006/0126523 | A1 | * | 6/2006 | Shin et al. | ................... 370/250 |

FOREIGN PATENT DOCUMENTS

| EP | 0973297 A2 | 1/2000 |
| JP | 8286992 | 11/1996 |
| JP | 2000270011 | 9/2000 |
| JP | 2001109630 | 4/2001 |
| JP | 2001136304 | 5/2001 |
| JP | 2002259260 | 9/2002 |
| WO | WO 0150263 A | 7/2001 |

\* cited by examiner

*Primary Examiner*—Brenda Pham
(74) *Attorney, Agent, or Firm*—Lee, Hong, Degerman, Kang & Waimey (57) ABSTRACT

Disclosed is a monitoring control system and method that can minimize network delay between a local side PC and a phone side PC when monitoring a mobile communication device in real time. By consecutively sending a plurality of monitoring requests for monitoring the mobile communication device via the Internet, monitoring the mobile communication device and consecutively receiving a plurality of monitoring results corresponding to the plurality of monitoring requests via the Internet, real time monitoring of the mobile communication device is facilitated with minimized delay.

22 Claims, 5 Drawing Sheets

LOCAL SIDE PC 50

PHONE SIDE PC 70

MONITORING CONTROL SYSTEM AND METHOD

CROSS-REFERENCE TO RELATED APPLICATIONS

Pursuant to 35 U.S.C. §119(a), this application claims the benefit of earlier filing date and right of priority to Korean Application No. 95933/2004, filed on Nov. 22, 2004, the contents of which is hereby incorporated by reference herein in its entirety

BACKGROUND OF THE INVENTION

1. Field of the Invention

The present invention relates to a monitoring unit for a mobile communication device, and more particularly, to a monitoring control system and method for a mobile communication device.

2. Description of the Related Art

As the types of mobile terminals and the services offered by mobile terminals have varied, the size of program code required to support a plurality of services has increased. Furthermore, as the operation of a mobile terminal has become more complicated, the interaction between various operations of a mobile terminal sometimes is not smooth, thereby making the mobile terminal unstable.

In order to stabilize the operation of a mobile terminal, a mobile terminal designer monitors the mobile terminal using a debugging unit. For example, a mobile terminal designer may monitor a mobile terminal through a monitoring unit and then debug the mobile terminal, or applications of the mobile terminal, by using a JTAG (joint test action group) Technology of a debugging unit.

Figure 1:
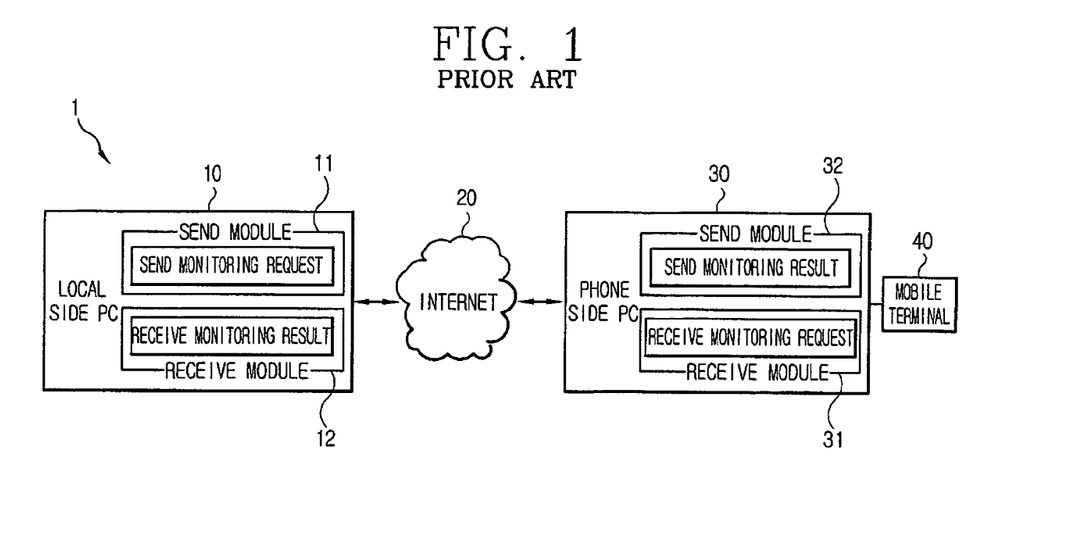
FIG. 1 illustrates the configuration of a conventional monitoring control system using the Internet.

A conventional system for controlling a unit for monitoring a mobile terminal before debugging the mobile terminal will be described with reference to FIG. 1. FIG. 1 illustrates a conventional monitoring control system I using the Internet. A personal computer (PC) having a monitoring unit mounted therein for monitoring a mobile terminal is defined as a phone side PC 10 and a PC having a remote controller mounted therein for controlling the monitoring unit is defined as a local side PC 30.

As illustrated in FIG. 1, the phone side PC 30 and the local side PC 10 are interconnected via the internet 20 and the mobile terminal 40 is connected to a communication port (not shown) of the phone side PC 30. The local side PC 10 sends a monitoring request to the phone side PC 30 and the phone side PC 30 monitors the mobile terminal 40 according to the monitoring request. The phone side PC 30 then sends a monitoring result to the local side PC 10 via the Internet 20. The local side PC 10 receives the monitoring result from the phone side PC 30.

A send module 11 of the local side PC 10 sends a monitoring request to the phone side PC 30 via the Internet 20 in response to a user request. A receive module 12 of the local side PC 10 receives a monitoring result from the phone side PC 30 and transfers the monitoring result to a display module (not shown).

A receive module 31 of the phone side PC 30 receives the monitoring request from the send module 11 of the local side PC 10 and transfers the monitoring request to a monitor module (not shown) of the phone side PC 10. A send module 32 of the phone side PC 30 receives a monitoring result from the monitor module and sends the monitoring result to the local side PC 10 via the Internet. The monitor module of the phone side PC 30 monitors the mobile terminal according to the monitoring request and then transfers the monitoring result to the send module 32.

Figure 2:
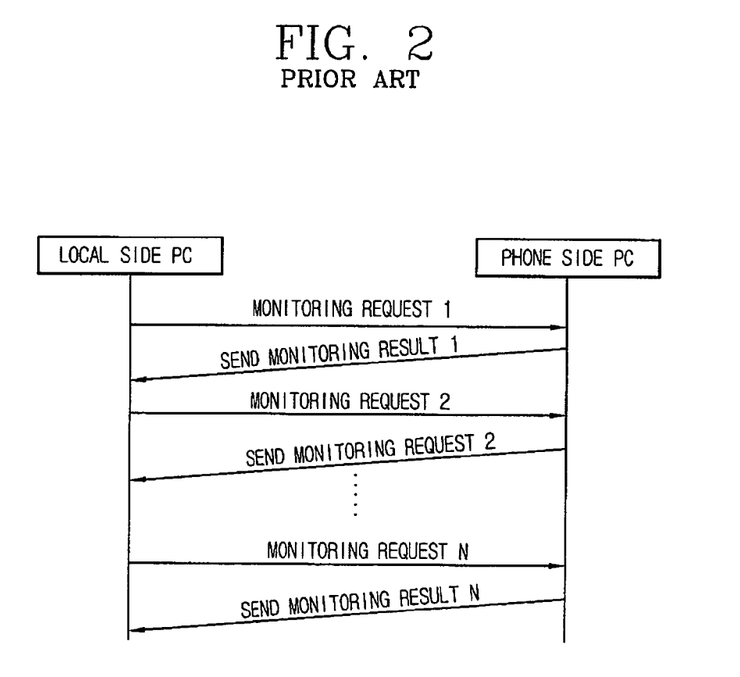
FIG. 2 illustrates the operational flow of a conventional monitoring control method using the Internet.

FIG. 2 illustrates the operational flow of a conventional monitoring control method using the Internet. As illustrated in FIG. 2, it is assumed that before a user debugs the mobile terminal 40 connected to the phone side PC 30 by using the local side PC 10, the local side PC 10 sends a monitoring request to the phone side PC 30 and the phone side PC 30 is in a one-to-one monitoring mode. In other words, the local side PC 10 sends a single monitoring request to the phone side PC 30, receives a single monitoring result from the phone side PC 30 corresponding to the single monitoring request, and displays the received monitoring result on a screen of the local side PC 10.

The local side PC 10 sends the monitoring request generated by a user to the phone side PC 30 and the phone side PC 30 monitors the mobile terminal 40 according to the received monitoring request. The phone side PC 30 then sends a monitoring result to the local side PC 10.

Since the local side PC 10 generates a single monitoring request to monitor the mobile terminal 40, sends the single monitoring request to the phone side PC 30 via the internet, and receives a single monitoring result corresponding to the single monitoring request, a network delay occurs due to the transit via the internet as the monitoring request and the monitoring result are received. For example, in order to monitor three applications installed on the mobile terminal, the local side PC 10 sends Monitoring Request 1 to monitor Application 1, sends Monitoring Request 2 to monitor Application 2 when Monitoring Result 1 is received, sends Monitoring Request 3 to monitor Application 3 when Monitoring Result 2 is received after sending Monitoring Request 2, and receives Monitoring Result 3 after sending Monitoring Request 3.

Consequently, a network delay occurs in the conventional monitoring control system because the local side PC 10 waits until a monitoring result is received before sending another monitoring request. Furthermore, the conventional monitoring control system has a disadvantage in that, if a network delay occurs due to the transit via the Internet when sending and receiving the monitoring request and the monitoring result, the mobile terminal cannot be monitored in real time. Moreover, the conventional monitoring control system has a disadvantage in that the local side PC and the phone side PC are disconnected if the network delay becomes too long.

Therefore, there is a need for a system and method for monitoring a mobile communication device in real time that can minimize network delay between a local side PC and a phone side PC. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. The invention is directed to provide a monitoring control system and method that can minimize network delay between a local side PC and a phone side PC when monitoring a mobile communication device in real time.

In one aspect of the present invention, a monitoring control system for a mobile communication device is provided. The system includes a controller adapted to consecutively send a plurality of monitoring requests for monitoring the mobile communication device via the internet and receive a plurality of monitoring results via the Internet and a monitoring unit connected to the mobile communication device and adapted to receive the plurality of monitoring requests and consecutively send the plurality of monitoring results corresponding to the plurality of monitoring requests via the Internet.

It is contemplated that the monitoring unit is further adapted to monitor a plurality of applications of the mobile communication device according to the plurality of monitoring requests. Preferably, the controller includes a monitoring pattern generating section adapted to generate a monitoring pattern including the plurality of monitoring requests, a pattern sending and receiving section adapted to sequentially send a start signal, a monitoring pattern and an end signal via the Internet and receive the plurality of monitoring results via the Internet, the start signal indicating the beginning of the monitoring pattern and the end signal indicating the end of the monitoring pattern and a monitoring result display section adapted to display the received plurality of monitoring results.

Preferably, the monitoring unit includes a signal sense module adapted to sense the start and end signals, a monitoring request storage section adapted to store the plurality of monitoring requests included in the monitoring pattern when the signal sense module senses the start signal, a monitoring pattern sensing section adapted to sense each of the plurality of monitoring requests included in the monitoring pattern and generate a monitoring sense signal when the signal sense module senses the start signal, a monitoring request processing section adapted to monitor the plurality of applications according to the plurality of monitoring requests stored in the monitoring request storage section upon receiving the monitoring sense signal and generate the plurality of monitoring results and a send module adapted to send the plurality of monitoring results via the Internet. It is contemplated that the monitoring result display section may be adapted to sequentially display the plurality of monitoring results as consecutively received or adapted to collate and sort the plurality of monitoring results before display.

In another aspect of the present invention, a monitoring control system for a mobile communication device is provided. The system includes a first PC adapted to generate and send a monitoring pattern including a plurality of monitoring requests for monitoring a plurality of applications of the mobile communication device via the Internet and receive a plurality of monitoring results via the Internet and a second PC connected to the mobile communication device and adapted to receive the monitoring pattern, monitor the plurality of applications according to the plurality of monitoring requests included in the monitoring pattern and send the plurality of monitoring results via the Internet.

Preferably, the first PC includes a monitoring pattern generating section adapted to generate the monitoring pattern, a pattern sending and receiving section adapted to sequentially send a start signal, the monitoring pattern and an end signal via the Internet and receive the plurality of monitoring results via the Internet, the start signal indicating the beginning of the monitoring pattern and the end signal indicating the end of the monitoring pattern and a monitoring result display section adapted to display the received plurality of monitoring results. It is contemplated that the first PC may be adapted to sequentially display the plurality of monitoring results as consecutively received or to collate and sort the plurality of monitoring results before display. It is further contemplated that the pattern sending and receiving section includes a send module adapted to sequentially output the start signal, the monitoring pattern and the end signal, a receive module adapted to receive the plurality of monitoring results via the Internet and to collate and sort the received plurality of monitoring results and a pattern send and receive module adapted to control the send module and the receive module to transfer the collated and sorted plurality of monitoring results from the receive module to the monitoring result display section.

Preferably, the second PC includes a signal sense module adapted to sense the start and end signals, a monitoring request storage section adapted to store the plurality of monitoring requests included in the monitoring pattern when the signal sense module senses the start signal, a monitoring pattern sensing section adapted to sense each of the plurality of monitoring requests included in the monitoring pattern and generate a monitoring sense signal when the signal sense module senses the start signal, a monitoring request processing section adapted to monitor the plurality of applications according to the plurality of monitoring requests stored in the monitoring request storage section upon receiving the monitoring sense signal and generate the plurality of monitoring results and a send module adapted to send the plurality of monitoring results via the Internet.

In another aspect of the present invention, a monitoring control method for a mobile communication device is provided. The method includes consecutively sending a plurality of monitoring requests for monitoring the mobile communication device via the Internet, monitoring the mobile communication device according to the plurality of monitoring requests, consecutively sending a plurality of monitoring results corresponding to the plurality of monitoring requests via the Internet and displaying the plurality of monitoring results.

It is contemplated that sending the plurality of monitoring requests via the Internet includes generating a monitoring pattern including the plurality of monitoring requests. It is further contemplated that sending the plurality of monitoring requests via the Internet further includes sequentially sending a start signal, the monitoring pattern and an end signal, the start signal indicating the beginning of the monitoring pattern and the end signal indicating the end of the monitoring pattern.

Preferably, monitoring the mobile communication device includes sensing the start and end signals, storing the plurality of monitoring requests included in the monitoring pattern when the start signal is sensed, sensing each of the plurality of monitoring requests included in the monitoring pattern and generating a monitoring sense signal when the start signal is sensed and monitoring a plurality of applications of the mobile communication device according to the plurality of stored monitoring requests upon receiving the monitoring sense signal. It is contemplated that the plurality of monitoring results may be sequentially displayed as consecutively received or collated and sorted before display.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention is directed to a monitoring control system and method that can minimize network delay between a local side PC and a phone side PC when monitoring a mobile communication device in real time. Although the present invention is illustrated with respect to monitoring a mobile terminal using PCs, it is contemplated that the present invention may be utilized anytime it is desired to monitor a mobile communication device in real time with minimized network delay between a first monitoring device and a second monitoring device.

As used herein, a PC having a controller adapted to consecutively send a plurality of monitoring requests for monitoring a mobile terminal via the Internet is referred to as a local side PC. As used herein, a PC having a monitoring unit that is connected to the mobile terminal and is adapted to receive a plurality of monitoring requests via the internet, monitor a plurality of applications according to the plurality of monitoring requests and consecutively send a plurality of monitoring results to the controller via the Internet is referred to as a phone side PC.

Figure 3:
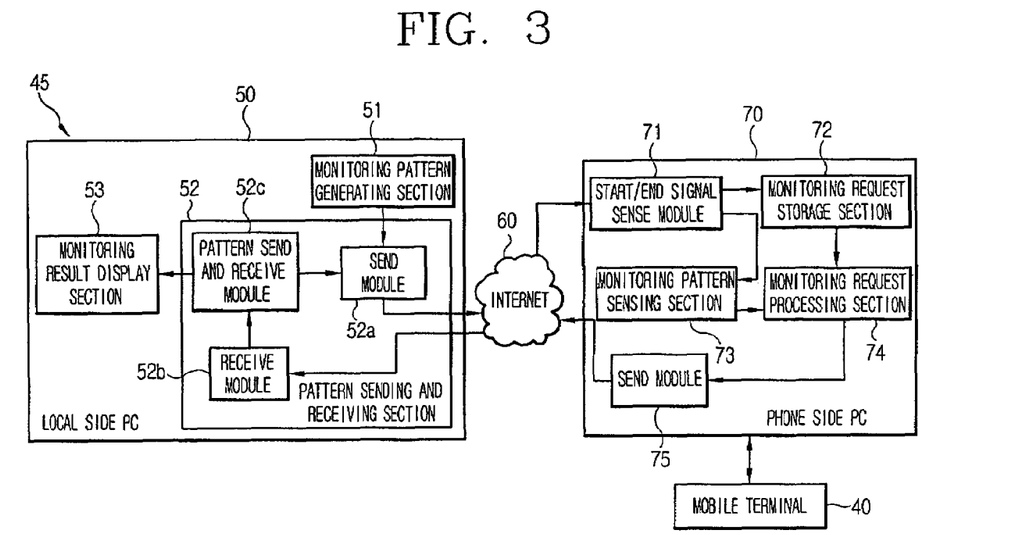
FIG. 3 illustrates a block diagram of a monitoring control system using the Internet in accordance with one embodiment of the present invention.

The present invention will now be described in detail with reference to the accompanying drawings. FIG. 3 illustrates a block diagram of a monitoring control system 45 using the Internet in accordance with one embodiment of the present invention.

As illustrated in FIG. 3, the monitoring control system 45 includes a local side PC 50 and a phone side PC 70. The local side PC 50 is adapted to generate a monitoring pattern that includes a plurality of monitoring requests for monitoring a mobile terminal 40, send the monitoring pattern to the phone side PC 70 via the Internet 60 and display a plurality of monitoring results sent from the phone side PC 70. The phone side PC 70 is connected to the mobile terminal 40 and adapted to receive the monitoring pattern from the local side PC, monitor the mobile terminal 40 according to the plurality of monitoring requests included in the monitoring pattern and send a plurality of monitoring results corresponding to the plurality of monitoring requests to the local side PC 50. The local side PC 50 is adapted to sequentially display the plurality of monitoring results consecutively sent from the phone side PC 70 or to collate and sort the monitoring results before displaying them.

The local side PC 50 includes a monitoring pattern generating section 51, a pattern sending and receiving section 52 and a monitoring result display section 53. The monitoring pattern generating section 51 is adapted to generate a monitoring pattern including a plurality of monitoring requests for monitoring a plurality of applications of a mobile terminal 40. The pattern sending and receiving section 52 is adapted to sequentially output a start signal, the monitoring pattern and an end signal, receive the plurality of monitoring results output from the phone side PC 70 via the internet 60 and collate and sort the received monitoring results. The monitoring result display section 53 is adapted to display the plurality of collated and sorted monitoring results.

The monitoring pattern generating section 51 may generate a plurality of monitoring patterns including a plurality of monitoring requests according to a user request. Each monitoring request included in the monitoring pattern is a signal for monitoring an application executed in the mobile terminal 40.

The pattern sending and receiving section 52 includes a send module 52a, a receive module 52b and a pattern send and receive module 52c. The send module 52a is adapted to sequentially output the start signal, the monitoring pattern and the end signal. The receive module 52b is adapted to receive the plurality of monitoring results output from the phone side PC 70 via the internet 60 and collate and sort the plurality of received monitoring results. The pattern send and receive module 52c is adapted to control the send module 52a and to transmit the plurality of collated and sorted monitoring results from the receive module 52b to the monitoring result display section 53.

The phone side PC 70 includes a start/end signal sense module 71, a monitoring request storage section 72, a monitoring pattern sensing section 73, a monitoring request processing section 74 and a send module 75. The start/end signal sense module 71 is adapted to sense a start signal and an end signal indicating, respectively, the beginning and end of the monitoring pattern. The monitoring request storage section 72 is adapted to store the plurality of monitoring requests included in the monitoring pattern sent through the start/end signal sense module 71 when the start/end signal sense module 71 senses the start signal. The monitoring pattern sensing section 73 is adapted to sense the monitoring pattern sent through the start/end signal sense module 71 and to generate a monitoring sense signal when the start/end signal sense module 71 senses the start signal. The monitoring request processing section 74 is adapted to monitor the plurality of applications of the mobile terminal 40 according to the plurality of monitoring requests stored in the monitoring request storage section 72 after receiving the monitoring sense signal and to store the plurality of monitoring results in a send buffer (not shown). The send module 75 is adapted to send the plurality of monitoring results stored in the send buffer to the local side PC 50 via the Internet 60.

First, the monitoring pattern generating section 51 generates a monitoring pattern including a plurality of monitoring requests for monitoring a plurality of applications of the mobile terminal 40 and sends the monitoring pattern to the send module 52*a*. When the monitoring pattern is received, the send module 52*a* sequentially sends a start signal to indicate the beginning of the monitoring pattern, the monitoring pattern and an end signal to indicate the end of the monitoring pattern to the phone side PC 70. The send module 52*a* sends the start signal, the monitoring pattern and the end signal to the start/end signal sense module 71 of the phone side PC 70 via the Internet 60 under control of the pattern send and receive module 52*c*.

The start/end signal sense module 71 of the phone side PC 70 switches from a one-to-one monitoring mode to a pattern-monitoring mode when it senses the start signal received via the Internet. The start/end signal sense module 71 switches from the pattern-monitoring mode to the one-to-one monitoring mode when it senses the end signal indicating the end of the monitoring pattern received via the Internet 60. The pattern-monitoring mode is a mode for consecutively sending a plurality of monitoring results after monitoring a plurality of applications according to a plurality of consecutively sent monitoring requests.

When the start/end signal sense module 71 receives the start signal, the monitoring request storage section 72 stores the plurality of monitoring results included in the monitoring pattern received after the start signal. The monitoring pattern sensing section 73 generates the monitoring pattern sent through the start/end signal sense module 71 after the start signal and outputs a monitoring sense signal to the monitoring request processing section 74.

The monitoring request processing section 74 monitors a plurality of applications corresponding to the plurality of monitoring requests stored in the monitoring request storage section 72 upon receiving the monitoring sense signal and then sequentially stores a plurality of monitoring results in a send buffer (not shown). The send module 75 consecutively sends the plurality of monitoring results stored in the send buffer to the receive module 52*b* of the local side PC via the Internet 60.

The receive module 52*b* receives the monitoring results from the send module 75 of the phone side PC 70 via the internet 60, collates and sorts the plurality of received monitoring results and transfers the plurality of collated and sorted monitoring results to the pattern send and receive module 52*c*. The pattern send and receive module 52*c* transfers the plurality of collated and sorted monitoring results from the receive module 52*b* to the monitoring result display section 53. The monitoring result display section 53 displays the plurality of collated and sorted monitoring results on a screen.

Figure 4:
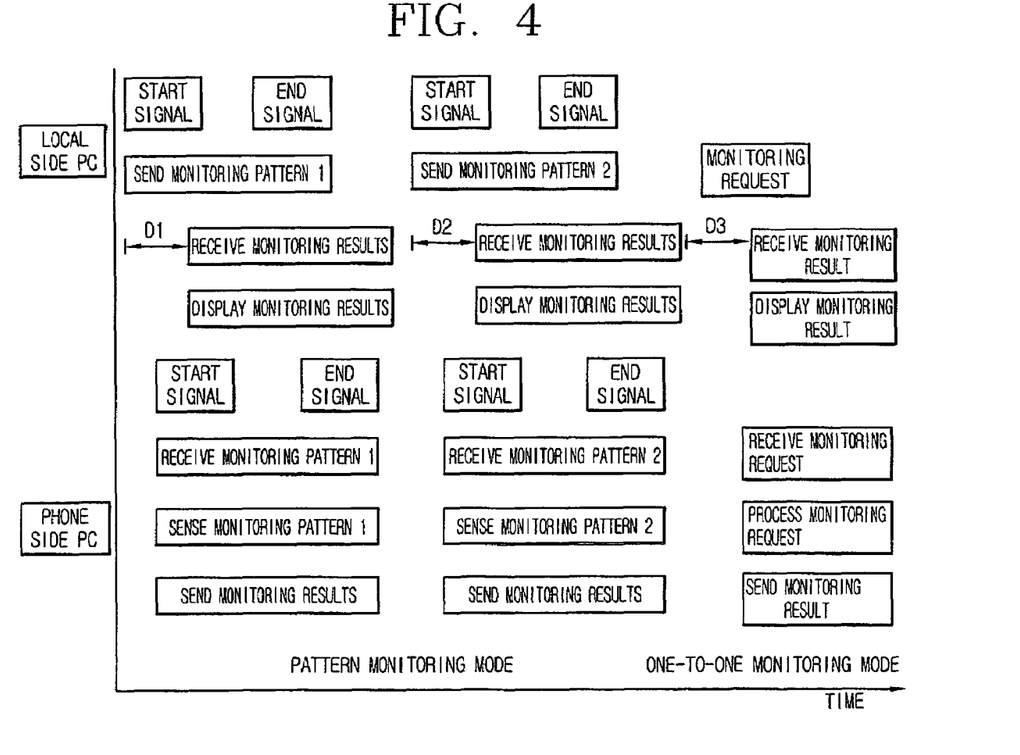
FIG. 4 illustrates the sending and receiving times of a monitoring pattern and monitoring results in accordance with one embodiment of the present invention.

FIG. 4 illustrates the sending and receiving times of a monitoring pattern and monitoring results in accordance with the present invention. Furthermore, FIG. 4 illustrates a pattern monitoring mode and a one-to-one monitoring mode.

As illustrated in FIG. 4, the local side PC 50 sequentially sends a start signal and Monitoring Pattern 1 to the phone side PC 70 in the pattern-monitoring mode. The phone side PC 70 receives Monitoring Pattern 1 by sensing the start signal and then sends monitoring results corresponding to monitoring requests of Monitoring Pattern 1 to the local side PC 50. The local side PC 50 receives and displays the monitoring results transmitted from the phone side PC 70. Since the local side PC 50 consecutively receives and displays the monitoring results, network delay occurs only when receiving the first monitoring result and the monitoring results are received without network delay after the second result.

As illustrated in FIG. 4, the local side PC 50 sends the phone side PC 70 one monitoring request instead of a monitoring pattern in the one-to-one monitoring mode. The phone side PC 70 receives the monitoring request and sends a single monitoring result corresponding to the monitoring request to the local side PC 50. The local side PC 50 receives and displays the single monitoring result transmitted from the phone side PC 70. Unlike the pattern-monitoring mode, the local side PC 50 receives a single monitoring result each time it sends a monitoring request. Therefore, network delay is increased.

Figure 5:
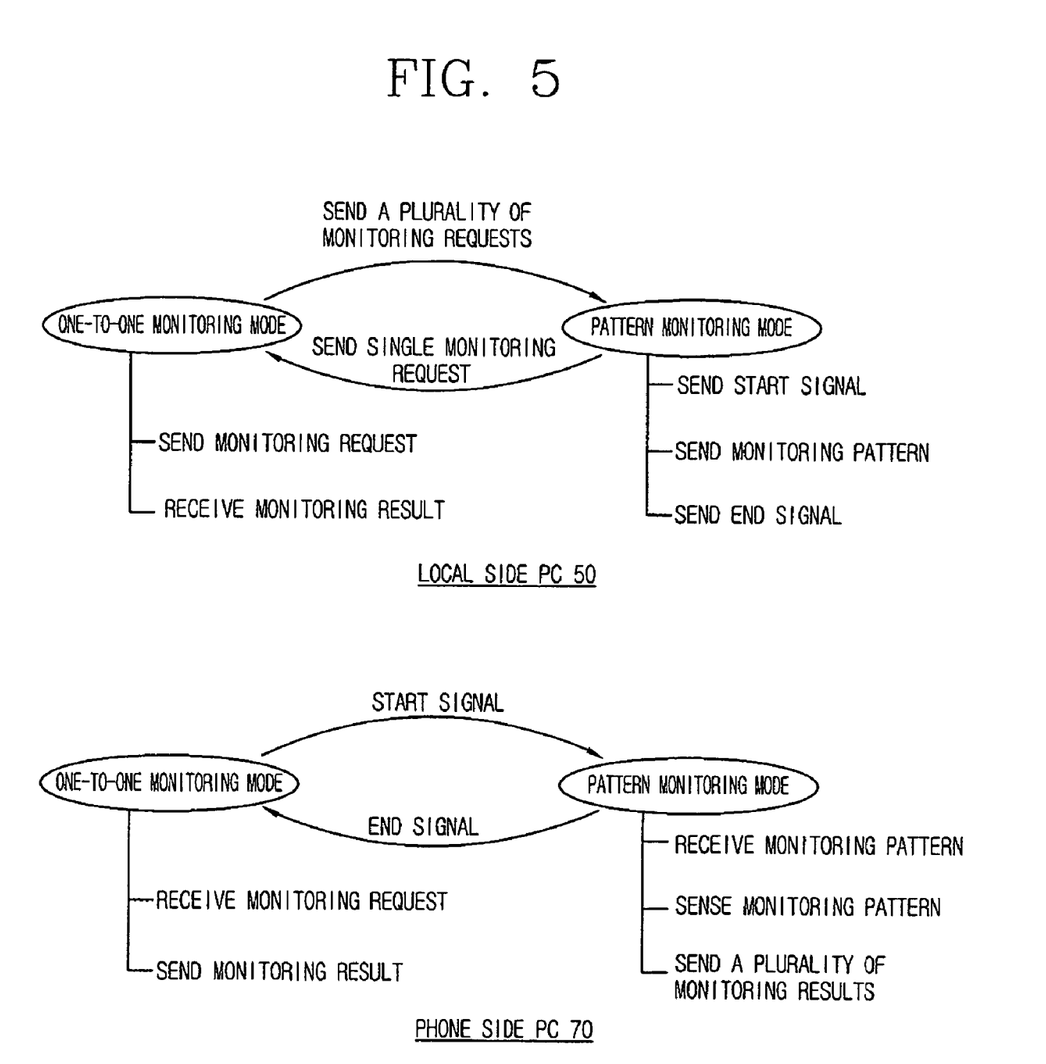
FIG. 5 illustrates an operating state diagram of a monitoring control method using the Internet in accordance with one embodiment of the present invention.

FIG. 5 illustrates an operating state diagram of a monitoring control method using the Internet according to the present invention. The transition between the one-to-one monitoring mode and pattern-monitoring mode is illustrated for both the local side PC 50 and the phone side PC 70.

In the one-to-one monitoring mode, the local side PC 50 sends a monitoring request and receives a single monitoring result corresponding to the monitoring request. In the pattern-monitoring mode, the local side PC 50 sequentially sends a start signal, a monitoring pattern and an end signal and consecutively receives a plurality of monitoring results corresponding to a plurality of monitoring requests included in the monitoring pattern.

In the one-to-one monitoring mode, the phone side PC 70 receives a monitoring request and sends a single monitoring result corresponding to the monitoring request. When a start signal is received from the local side PC 50, the phone side PC 70 switches from the one-to-one monitoring mode to the pattern-monitoring mode, receives a monitoring pattern and sends a plurality of monitoring results corresponding to a plurality of monitoring requests included in the monitoring pattern. The phone side PC 70 switches from the pattern-monitoring mode to the one-to-one monitoring mode when an end signal is received from the local side PC 50.

Figure 6:
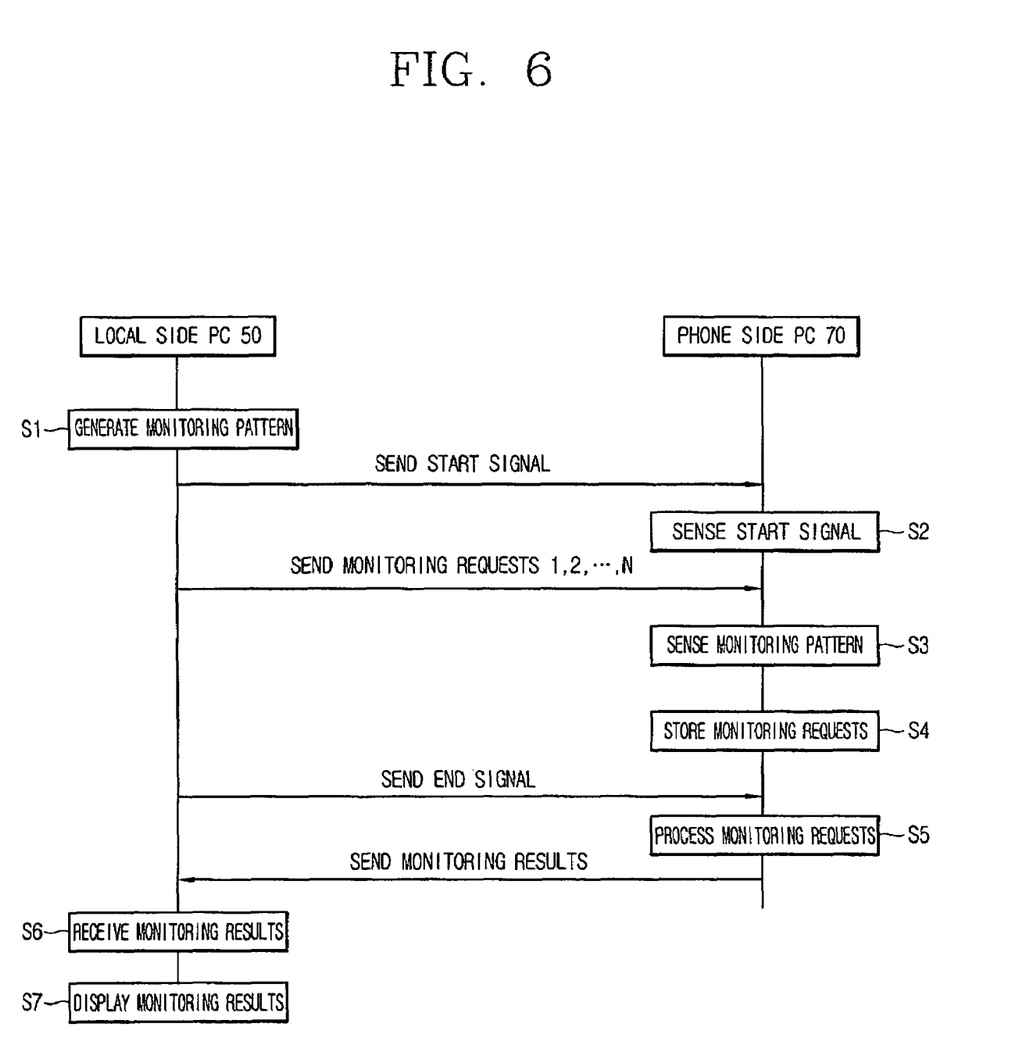
FIG. 6 illustrates the operational flow of a monitoring control method using the Internet in accordance with one embodiment of the present invention.

FIG. 6 illustrates the operational flow for a monitoring control method using the Internet in accordance with an embodiment of the present invention. The explanation of the operational flow assumes that applications of a mobile terminal to be monitored are selected, the one-to-one monitoring mode is switched to the pattern-monitoring mode and the applications of the mobile terminal connected to the phone side PC are debugged.

First, the local side PC 50 generates a monitoring pattern including a plurality of monitoring requests for monitoring a plurality of applications of the mobile terminal 40 according to a user request in order to determine if the plurality of applications installed on the mobile terminal 40 are operating normally (S1). The local side PC 50 sends a start signal indicating the beginning of the monitoring pattern to the phone side PC 70 in the pattern-monitoring mode.

The phone side PC 70 senses the start signal sent from the local side PC 50 and switches from the one-to-one monitoring mode to the pattern-monitoring mode (S2). The phone side PC 70 senses the monitoring pattern sent from the local side PC 50 after the start signal (S3) and sequentially stores the plurality of monitoring requests (Monitoring Requests 1, 2, . . . , N) included in the monitoring pattern (S4). The phone side PC 70 processes the monitoring requests and monitors the plurality of applications of the mobile terminal 40 according to the plurality of stored monitoring requests, and then sends a plurality of monitoring results corresponding to the plurality of monitoring requests to the local side PC 50 (S5).

The local side PC 50 receives the plurality of monitoring results sent from the phone side PC 70 (S6) and sequentially displays the plurality of received monitoring results on a screen or collates and sorts the plurality of monitoring results and displays the collated and sorted monitoring results on the screen (S7). At the same time, when the plurality of monitoring requests are all sent to the phone side PC 70, the local side PC 50 sends an end signal to the phone side PC 70 to indicate the end of the plurality of monitoring requests included in the monitoring pattern.

When the end signal is received, the phone side PC 70 sends the plurality of monitoring results corresponding to the plurality of monitoring requests to the local side PC 50 and then switches from the pattern-monitoring mode to the one-to-one monitoring mode. Since the one-to-one monitoring mode is well known in the prior art, a detailed description will be omitted.

Figure 7:
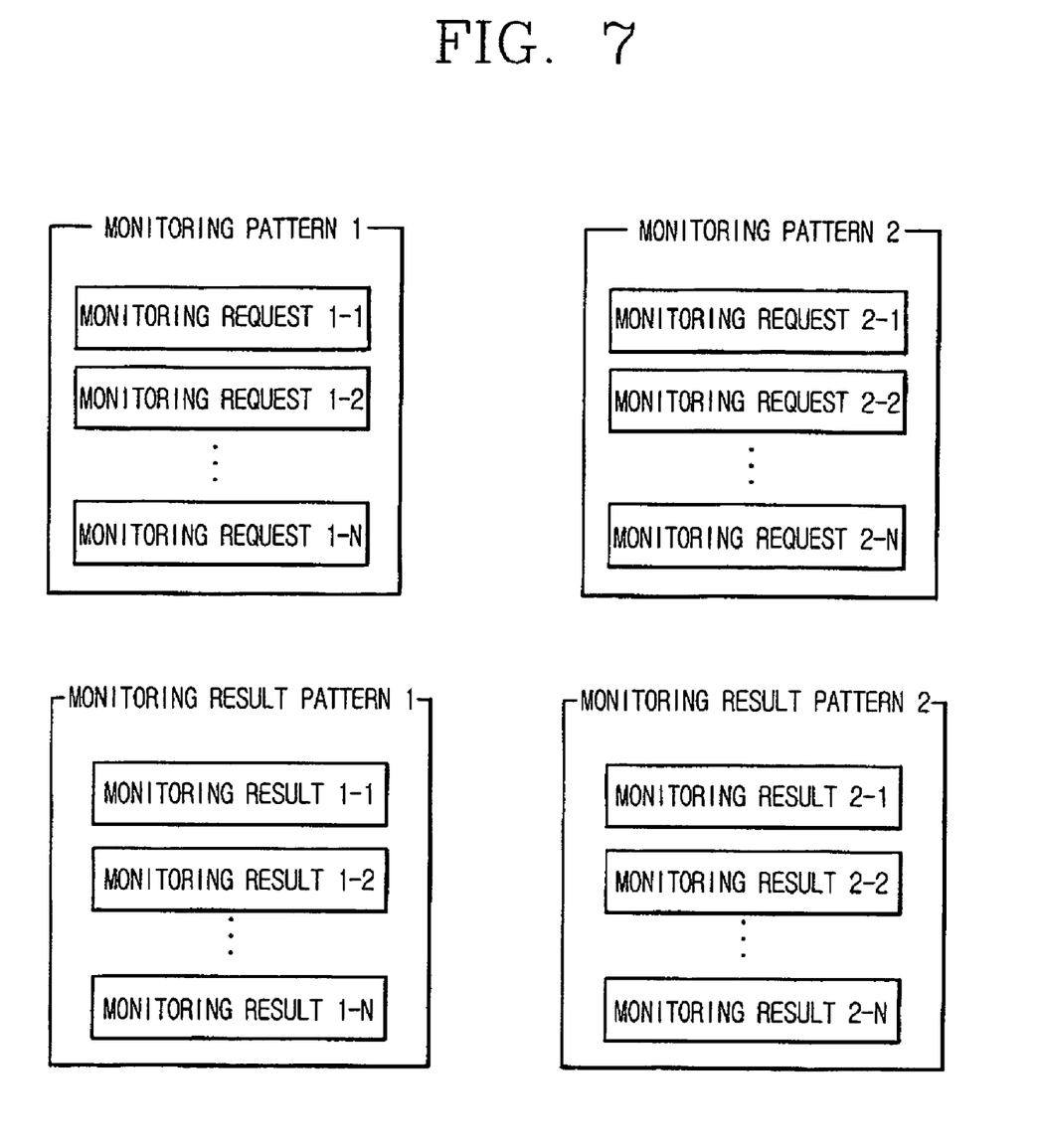
FIG. 7 illustrates an information list of the monitoring pattern and monitoring results in accordance with one embodiment of the present invention.

FIG. 7 illustrates an information list of the monitoring pattern and monitoring results of the present invention. Monitoring Patterns 1 and 2 each consist of a plurality of monitoring requests for monitoring a plurality of applications of a mobile terminal 40. Monitoring Result Patterns 1 and 2 each consist of a plurality of monitoring results generated by monitoring the plurality of applications according to the plurality of monitoring requests. The monitoring request processing section 74 consecutively sends the monitoring results, beginning with the first generated result, or sends a monitoring result pattern including the plurality of monitoring results to the local side PC 50 through the send module 75.

As described herein, the monitoring control system and method in accordance with the present invention minimizes network delay between the local side PC and the phone side PC when monitoring a mobile terminal by consecutively sending a plurality of monitoring requests to the phone side PC and consecutively receiving a plurality of monitoring results from the phone side PC. Furthermore, the monitoring control system and method in accordance with the present invention prevents disconnection of the local side PC and the phone side PC due to network delay since a mobile terminal is monitored in real time with minimized network delay between the local side PC and the phone side PC.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A monitoring control system for a mobile communication device, the system comprising:
    a controller for sending a monitoring pattern including a plurality of monitoring requests via the Internet and receiving a monitoring result pattern including a plurality of monitoring results via the Internet, wherein each of the plurality of monitoring requests is different; and
    a monitoring unit connected to the mobile communication device for receiving the monitoring pattern, monitoring a plurality of applications of the mobile communication device according to the plurality of monitoring requests and sending the monitoring result pattern including the plurality of monitoring results via the Internet, the plurality of monitoring results corresponding to the plurality of monitoring requests.

2. The system of claim 1, wherein the controller comprises:
    a monitoring pattern generating section for generating the monitoring pattern including the plurality of monitoring requests;
    a pattern sending and receiving section for sequentially sending a start signal, the monitoring pattern and an end signal via the Internet and receiving the monitoring result pattern via the Internet, the start signal indicating the beginning of the monitoring pattern and the end signal indicating the end of the monitoring pattern; and
    a monitoring result display section for displaying the received plurality of monitoring results.

3. The system of claim 2, wherein the monitoring unit comprises:
    a signal sense module for sensing the start and end signals;
    a monitoring request storage section for storing the plurality of monitoring requests included in the monitoring pattern when the signal sense module senses the start signal;
    a monitoring pattern sensing section for sensing each of the plurality of monitoring requests included in the monitoring pattern and generating a monitoring sense signal when the signal sense module senses the start signal;
    a monitoring request processing section for monitoring the plurality of applications according to the plurality of monitoring requests stored in the monitoring request storage section upon receiving the monitoring sense signal and generating the plurality of monitoring results; and
    a send module for sending the monitoring result pattern via the Internet.

4. The system of claim 2, wherein the monitoring result display section further sequentially displays the plurality of monitoring results as consecutively received.

5. The system of claim 2, wherein the monitoring result display section further collates and sorts the plurality of monitoring results before display.

6. The system of claim 1, wherein the controller is further sequentially displays the plurality of monitoring results as consecutively received.

7. The system of claim 6, wherein the controller is further collates and sorts the plurality of monitoring results before display.

8. A monitoring control system for a mobile communication device, the system comprising:
    a first PC for generating and sending a monitoring pattern via the Internet and receiving a monitoring result pattern via the Internet, wherein the monitoring pattern includes a plurality of monitoring requests for monitoring a plurality of applications of the mobile communication device, each of the plurality of monitoring requests is different and the monitoring result pattern includes a plurality of monitoring results; and
    a second PC connected to the mobile communication device for receiving the monitoring pattern, monitoring the plurality of applications according to the plurality of monitoring requests included in the monitoring pattern, generating the plurality of monitoring results corresponding to the plurality of monitoring requests and sending the monitoring pattern including the plurality of monitoring results via the Internet.

9. The system of claim 8, wherein the first PC comprises:
    a monitoring pattern generating section for generating the monitoring pattern;
    a pattern sending and receiving section for sequentially sending a start signal, the monitoring pattern and an end signal via the Internet and receiving the monitoring result pattern via the Internet, the start signal indicating the beginning of the monitoring pattern and the end signal indicating the end of the monitoring pattern; and
    a monitoring result display section for displaying the received plurality of monitoring results.

10. The system of claim 9, wherein the monitoring result display section further sequentially displays the plurality of monitoring results as consecutively received.

11. The system of claim 9, wherein the monitoring result display section further collates and sorts the plurality of monitoring results before display.

12. The system of claim 11, wherein the pattern sending and receiving section comprises:
a send module for sequentially outputting the start signal, the monitoring pattern and the end signal;
a receive module for receiving the monitoring result pattern via the Internet and collating and sorting the received plurality of monitoring results; and
a pattern send and receive module for controlling the send module and the receive module and to transfer the collated and sorted plurality of monitoring results from the receive module to the monitoring result display section.

13. The system of claim 9, wherein the second PC comprises:
a signal sense module for sensing the start and end signals;
a monitoring request storage section for storing the plurality of monitoring requests included in the monitoring pattern when the signal sense module senses the start signal;
a monitoring pattern sensing section for sensing each of the plurality of monitoring requests included in the monitoring pattern and generating a monitoring sense signal when the signal sense module senses the start signal;
a monitoring request processing section for monitoring the plurality of applications according to the plurality of monitoring requests stored in the monitoring request storage section upon receiving the monitoring sense signal and generating the plurality of monitoring results; and
a send module for sending the monitoring result pattern via the Internet.

14. The system of claim 8, wherein the first PC further sequentially displays the plurality of monitoring results as consecutively received.

15. The system of claim 14, wherein the first PC further collates and sorts the plurality of monitoring results before display.

16. A monitoring control method for a mobile communication device, the method comprising:
receiving a monitoring pattern including a plurality of monitoring requests via the Internet, wherein each of the plurality of monitoring requests is different;
monitoring a plurality of applications of the mobile communication device according to the plurality of monitoring requests included in the monitoring pattern;
generating a plurality of monitoring results corresponding to the plurality of monitoring requests;
sending a monitoring result pattern including the plurality of monitoring results via the Internet; and
displaying the plurality of monitoring results.

17. The method of claim 16, wherein sending the monitoring pattern via the internet further comprises sequentially sending a start signal, the monitoring pattern and an end signal, the start signal indicating the beginning of the monitoring pattern and the end signal indicating the end of the monitoring pattern.

18. The method of claim 17, further comprising:
sensing the start and end signals;
storing the plurality of monitoring requests included in the monitoring pattern when the start signal is sensed;
sensing each of the plurality of monitoring requests included in the monitoring pattern and generating a monitoring sense signal when the start signal is sensed; and
monitoring a plurality of applications of the mobile communication device according to the plurality of stored monitoring requests upon receiving the monitoring sense signal.

19. The method of claim 16, wherein displaying the plurality of monitoring results comprises sequentially displaying the plurality of monitoring results as consecutively received.

20. The method of claim 16, wherein displaying the plurality of monitoring results comprises collating and sorting the plurality of monitoring results before display.

21. A mobile terminal, comprising:
a signal sense module sensing start and end signals sent from a local side PC;
a monitoring pattern generating section generating a monitoring sense signal by sensing a monitoring pattern sent through the signal sense module when the start signal is sensed by the signal sense module;
a monitoring request storage section storing a plurality of monitoring requests included in the monitoring pattern sent through the signal sense module;
a monitoring request processing section monitoring a plurality of applications according to the plurality of monitoring requests stored in the monitoring request storage section after receiving the monitoring sense signal and then sending a plurality of monitoring results; and
a send module sending the plurality of monitoring results sent from the monitoring request processing section to the local side PC via the Internet,
wherein a one-to-one monitoring mode is converted into a pattern monitoring mode when the signal sense module senses the start signal sent from the local side PC and the pattern monitoring mode is then converted into the one-to-one monitoring mode.

22. A method for sending monitoring requests from a local side PC to a mobile terminal side PC and receiving monitoring results from the mobile terminal side PC, the method comprising:
receiving a monitoring pattern for monitoring a plurality of applications from the local side PC;
monitoring the plurality of applications according to a plurality of monitoring requests included in the received monitoring pattern; and
sending a plurality of monitoring results to the local side PC,
wherein sending the plurality of monitoring results comprises:
converting a one-to-one monitoring mode into a pattern monitoring mode when a start signal indicating the initiation of sending the monitoring pattern is received from the local side PC,
sensing the monitoring pattern sent from the local side PC in the pattern monitoring mode,
monitoring the plurality of applications according to the plurality of monitoring requests included in the sensed monitoring pattern,
sending the plurality of monitored monitoring results to the local side PC when an end signal indicating the termination of sending the monitoring pattern is received from the local side PC, and
converting the pattern monitoring mode to the one-to-one monitoring mode after all of the plurality of monitoring results are sent to the local side PC.

* * * * *